US006768408B2

(12) United States Patent
Gilmore et al.

(10) Patent No.: US 6,768,408 B2
(45) Date of Patent: Jul. 27, 2004

(54) METHOD OF CONFIGURING COMMON MODE/DIFFERENTIAL MODE CHOKE

(75) Inventors: Thomas P. Gilmore, Wauwatosa, WI (US); Glenn Ray, Big Bend, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 65 days.

(21) Appl. No.: 10/612,861

(22) Filed: Jul. 3, 2003

(65) Prior Publication Data

US 2004/0004528 A1 Jan. 8, 2004

Related U.S. Application Data

(63) Continuation of application No. 09/832,562, filed on Apr. 11, 2001, now Pat. No. 6,617,950.

(51) Int. Cl.[7] .............................................. H01F 27/28
(52) U.S. Cl. ....................................... 336/29; 29/602.1
(58) Field of Search .................... 336/60, 83, 174–175, 336/178, 212, 219, 229; 29/602.1, 603.23, 604–607

(56) References Cited

U.S. PATENT DOCUMENTS

| | | | |
|---|---|---|---|
| 2,412,345 A | | 12/1946 | Lindenblad |
| 4,045,823 A | * | 8/1977 | Parton .......................... 361/58 |
| 4,777,466 A | * | 10/1988 | Bordalen ..................... 336/180 |
| 5,539,369 A | * | 7/1996 | Selker et al. ................ 336/212 |
| 5,659,251 A | | 8/1997 | Wakamatsu |
| 6,512,438 B1 | * | 1/2003 | Yoshimori et al. .......... 336/178 |

* cited by examiner

Primary Examiner—Tuyen T. Nguyen
(74) Attorney, Agent, or Firm—Quarles & Brady; William R. Walbrun

(57) ABSTRACT

A common mode and differential mode inductance assembly including first and second toroidal cores wherein first and second windings are wrapped about first and second segments of the first core and the first core forms a first surface and wherein the second core forms a second surface and is positioned adjacent the first core such that the first and second surfaces oppose each other and a gap is formed between the first and second surfaces.

23 Claims, 4 Drawing Sheets

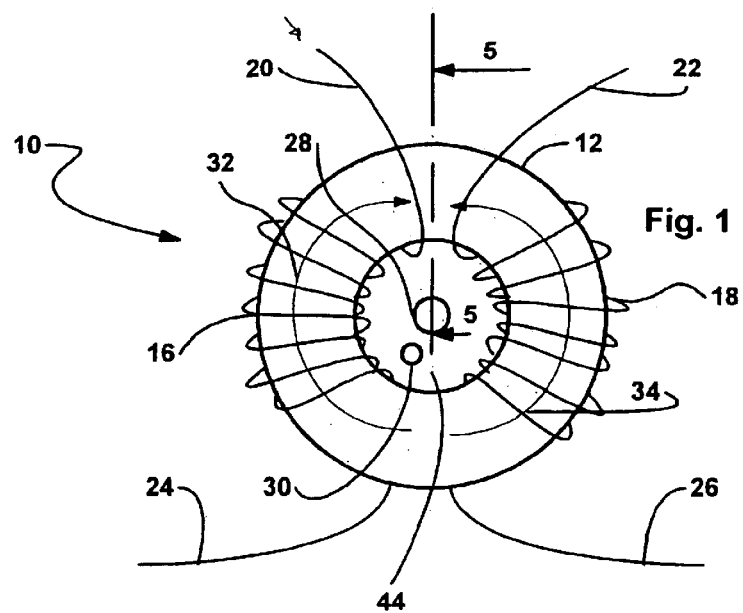
Fig. 1
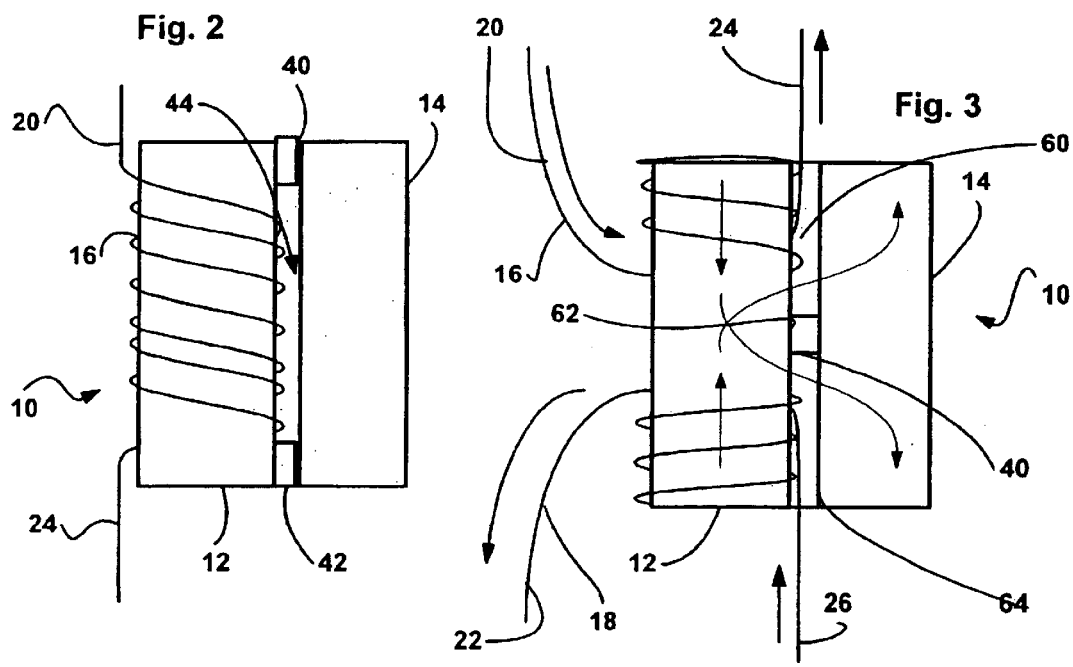
Fig. 2
Fig. 3

METHOD OF CONFIGURING COMMON MODE/DIFFERENTIAL MODE CHOKE

CROSS-REFERENCE TO RELATED APPLICATIONS

This application is a continuation of U.S. patent application Ser. No. 09/832,562 that was filed on Apr. 11, 2001, now U.S. Pat. No. 6,617,950 titled "Common Mode/Differential Mode Choke.

STATEMENT REGARDING FEDERALLY SPONSORED RESEARCH OR DEVELOPMENT

Not applicable.

BACKGROUND OF THE INVENTION

This invention relates to filters used in power electronic devices such as switch-mode power supplies. More specifically, the invention relates to integrated-magnetic filters that provide both common-mode and differential mode inductance.

Power electronic devices generate radio frequency noise that can be conducted to output leads or back through power lines linked thereto. This noise can interfere with operation of other electronic equipment linked to the power lines or the outputs. In addition, normal operation of power electronic devices can be disturbed by noise and transients present on power supply lines. It is therefore desirable to place a filter at the input of these devices in order to provide a level of isolation between the devices and the power system.

Noise currents can be described in terms of differential-mode and common-mode noise components. Differential-mode noise components consist of currents of equal magnitude flowing in opposite directions in supply and return lines. Common-mode noise components consist of currents of equal magnitude flowing in the same direction in both the supply and return lines. The return path for common-mode currents is a ground connection.

Differential-mode noise is typically filtered by placing one or more inductors in series with the supply line, the return line or both. Common-mode noise is usually filtered by placing a pair of coupled inductors wound on the same core in series with the supply and return lines. In order to save space and reduce cost, integrated-magnetic filters which provide both common-mode and differential-mode noise attenuation have been devised.

U.S. Pat. No. 5,155,676 (the '676 patent) teaches several different general structures that can be used to configure common mode-differential mode inductors. In U.S. Pat. No. 5,155,676 (the '676 patent) teaches several different general structures that can be used to configure common mode-differential mode inductors. In particular, the '676 patent teaches one structure including a "Figure 8" core comprising three legs that traverse the distance between top and bottom core members. The legs and members define two windows in the core. The '676 patent teaches that two identical windings can be provided, one on each outer leg where each winding begins at a supply side, passes from front to back through a respective window and wraps around the corresponding leg several times before ending at a load end. The windings form identical turns about the legs.

In this case, common mode noise currents in each winding pass through the respective core windows going from front to back of the core. The associated magnetic fluxes in the core add in a flux path through the outer legs, and subtract in the center leg. The net common-mode flux thus encircles both windows, with no flux in the center leg.

Differential mode noise currents, on the other hand, pass through corresponding core windows going in different directions with respect to the front and back of the core. For instance, if the differential mode current in a first winding goes from front to back, the current in the second winding passes through the other core window from back to front. Magnetic fluxes produced by the differential mode currents travel in opposite directions in the outer legs so that net differential-mode flux encircles each window, with twice the flux in the center leg as in each outer leg.

Such integrated-magnetic assemblies are often used to filter unwanted high frequency noise on conductors which carry DC power to electronic devices or equipment. Thus, these integrated-magnetic assemblies must provide filtering for common and differential noise while accommodating the differential current delivering power. In general, the larger the inductance for each mode, the larger the attenuation provided for the noise. The desire is then to increase both the differential and common-mode inductance in the integrated-magnetic assembly in order to provide increased noise attenuation. However, since the differential flux path must accommodate flux associated with power flow, while the common-mode need not, the design considerations for the two inductances are different.

The common-mode inductance in the '676 structure described above is obtained using a flux path around both windows. The inductance associated with this path increases directly with increasing permeability of the core material in this path. For a given material, permeability is maximized if there are no air gaps in the path. Therefore, for increased noise attenuation, a common-mode flux path will be formed of high-permeability material arranged to form an un-gapped flux path.

The differential-mode inductance in an integrated-magnetic assembly like the one described in the '676 patent is obtained using the flux path through the center leg. This magnetic flux path must accommodate the flux from the AC line or DC power without exceeding the saturation flux density of any material in the flux path. A standard practice in the design of a differential inductor is to introduce an air gap to limit the flux. An air gap increases the reluctance of the flux path (i.e., decreases the ease with which flux flows in the path). This increased reluctance allows less flux to flow for a given current in the windings, and thus helps to keep the flux density level below the saturation level of the materials, but reduces the inductance, compared to an un-gapped path. The '676 patent teaches one structure where the center leg forms a gap as described herein.

As well known in the art, one way to increase permeability is to form the core from a plurality of laminates. To this end, one core configuration that has particularly advantageous operating characteristics includes flat steel laminates stacked to form a Figure 8 core configuration with a gap in the center leg as described above. While this solution has advantageous operating characteristics, the laminate stacking task can be labor intensive and therefore relatively expensive.

BRIEF SUMMARY OF THE INVENTION

It has been recognized that all of the benefits of prior art common mode/differential mode inductance assemblies can be accomplished with a new assembly configuration that, at lest in some respects, is less expensive to produce than other configurations that operate efficiently. To this end, an exemplary embodiment of the invention includes an assembly having improved damping characteristics and comprising a first toroidal core of magnetic material having at least first and second core segments and forming a first surface, a fist winding encircling the first core segment, a second winding encircling the second core segment, the first and second winding segments wrapped in the same direction about the core segments and a second toroidal core forming a second surface and secured proximate the first toroidal core and outside the windings such that the first and second surfaces oppose each other and form an air gap there between.

In one aspect the first toroidal core provides a common mode inductance and the first and second cores and the gap provide a damped differential mode inductance.

In several embodiments the toroidal cores are secured together by an epoxy. In some designs the epoxy fills the space within the first toroidal core and may also fill the space within the second toroidal core. The epoxy may form at least one mounting aperture within the first toroidal core. The assembly may further including an insulative spacer between the first and second cores.

Thus, the epoxy can perform several functions including electrically insulating the first and second cores, providing the gap between the two cores and providing a mounting mechanism for the assembly.

Either or both of the first and second cores may include a ribbon of metallic material wrapped in torrid form. The first torrid in some embodiments is coated with an insulating varnish binder material.

In this regard, it has been recognized that the labor involved with wrapping a metallic ribbon to form a torrid is substantially less than that required to stack laminates to form a Figure 8 core or some of the other cores that have been attempted in the industry. Thus, the present invention should reduce manufacturing costs while still providing an assembly that performs effectively).

The first toroidal core may be formed about an axis and the first surface may be perpendicular to the axis. In the alternative, the first surface may be an internal surface of the first toroidal core and the second toroidal core may be positioned within the first toroidal core.

The invention also includes a method for forming an electromagnetic assembly having improved damping characteristics, the method comprising the steps of providing a first toroidal core of magnetic material having at least first and second core segments, the first toroidal core forming a first surface, winding a first winding about the first core segment, winding a second winding about the second core segment and providing a second toroidal core adjacent the first toroidal core such that a second surface formed by the second core opposes the first surface and the first and second surfaces form a gap there between.

The step of providing the second toroidal core may include providing the second toroidal core adjacent the first toroidal core. In the alternative, the step of providing the second toroidal core may include providing the second core within the first toroidal core.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a perspective view of an inductance assembly according to one embodiment of the present invention;

FIG. 2 is a side elevational view of the assembly of FIG. 1;

FIG. 3 is a top elevational view of the assembly of FIG. 1;

DETAILED DESCRIPTION OF THE INVENTION

Figure 4:
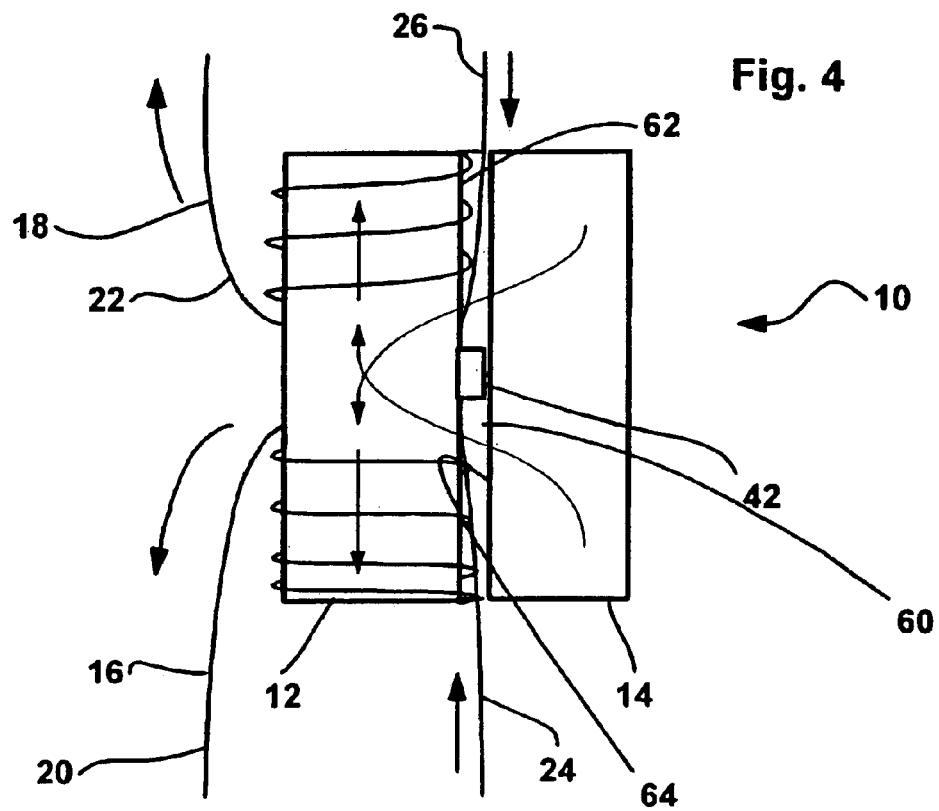
FIG. 4 is a bottom elevational view of the assembly of FIG. 1.

Referring now to the drawings wherein like reference numbers refer to similar elements throughout the views and, specifically, referring to FIGS. 1 through 5, one embodiment of the invention includes a first core 12, a second core 14, a first winding 16, a second winding 18, a disc shaped member 44 and, optionally, first and second spacer members 40 and 42. First core 12 is toroidal in form having first and second sections corresponding to the left and right halves of the core as illustrated in FIG. 1. Referring also to FIG. 6, in one embodiment the first core 12 is formed by wrapping a metallic material ribbon 50 annularly about an axis 52. Preferably ribbon 50 is relatively thin. For instance, ribbon 50 may be between 3 and 15 millimeters in thickness. Ribbon 50 may have various widths, an exemplary width being approximately 1 inch. After ribbon 50 is wound to form an annular structure, the ribbon may be painted or dipped in an insulating varnish which, when dry, holds the core 12 together in the toroidal form.

Referring specifically to FIGS. 2, 3, 4 and 5, second toroidal core 14 is similar to first core 12 in the illustrated embodiment. Core 14, like core 12, is, at least in one embodiment, formed by wrapping a metallic ribbon annularly until the core thickness desired is achieved (i.e., see FIG. 6). Core 14 may take any of several different widths being either wider, less wide or equally as wide as first core 12. As illustrated, core 14 is slightly less wide than first core 12. As with first core 12, preferably second core 14 is formed of steel.

Referring again to FIGS. 1 through 5, first winding 16 is wrapped around the first section (i.e., the left half) of first core 12 while second winding 18 is wrapped around the second section (i.e., the right half of core 12). Winding 16 includes first and second ends 20 and 24, respectively while second winding 18 includes first and second ends 22 and 26, respectively. Starting at the first end 20 of winding 16, the first winding 16 wraps from front to back of core 12 and forms a plurality of coils about the first section of core 12 before second end 24 extends from the core 12. Similarly, beginning at first end 22 of winding 18, winding 18 wraps from the front to the back of the second section of core 12, forms a plurality of coils about the second section and then second end 26 extends from core 12. The number of coils formed by each winding 18 and 16 is identical.

Figure 5:
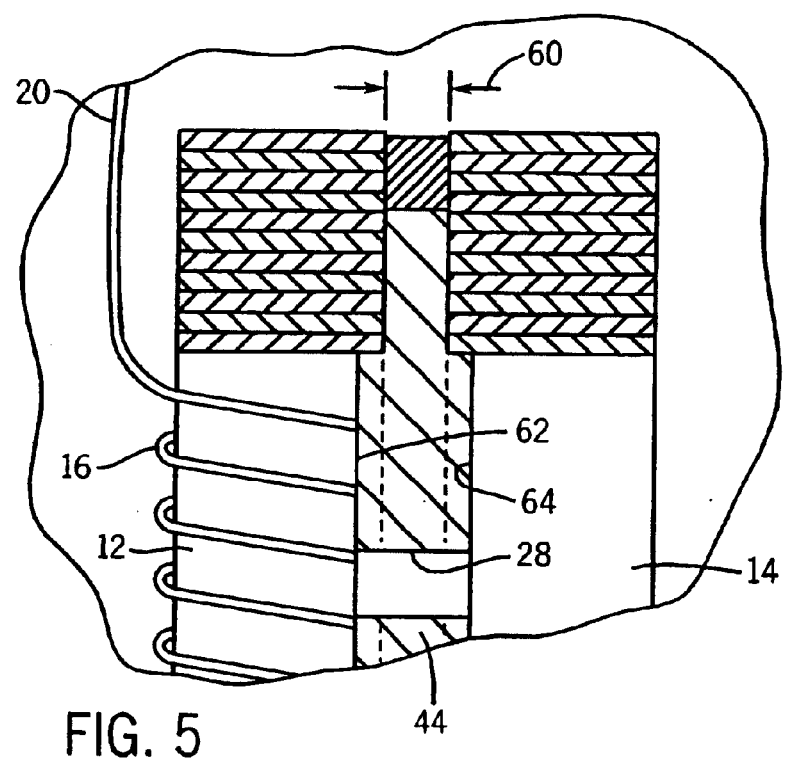
FIG. 5 is a cross section taken along the line 5—5 in FIG. 1.
Figure 6:
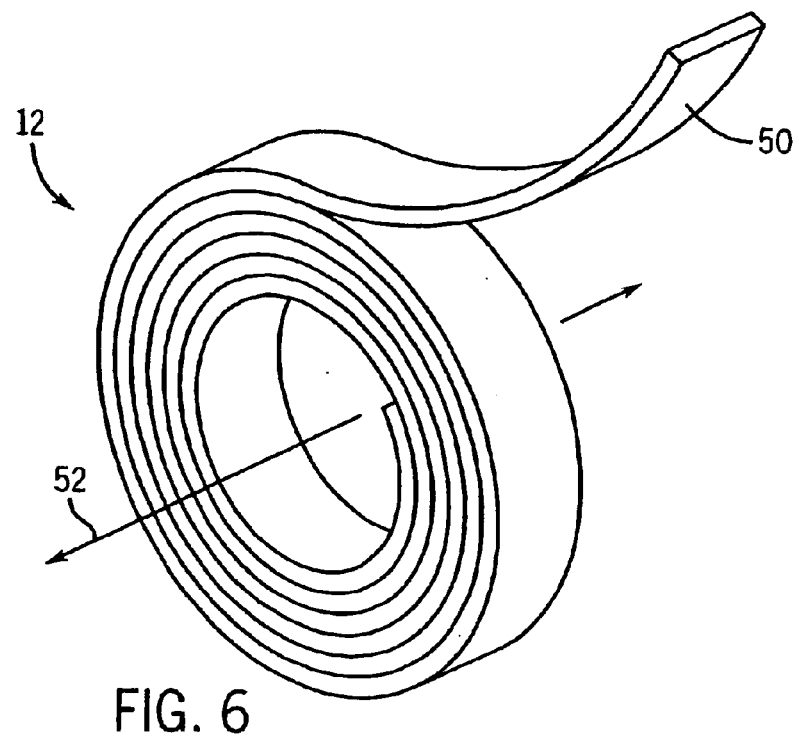
FIG. 6 is a perspective view of the core 12 prior to complete assembly.

As best seen in FIGS. 3 through 5, when the inventive configuration is assembled, first and second cores 12, 14, respectively, are secured together such that facing first and second surfaces 62, 64 of the first and second cores 12, 14 form a gap 60 therebetween. To ensure an ideal gap size, electrically insulating spacers 40 and 42 are provided that have a thickness equal to the thickness of the desired gap 60. The spacers 40 and 42 are equi-spaced about the first side 62 of core 12 along the line that bisects the core 12 into the first and second sections (i.e., the left and right-hand sides of the core in FIG. 1).

Referring again to FIGS. 1 through 5, an epoxy resin that can harden to form a disc is used to secure first and second cores 12, 14 together. The resin disc is identified generally by reference numeral 44. The disc 44 effectively fills gap 60 between first and second cores 12, 14 and, in at least one embodiment, has a thickness that is slightly greater than gap 60 in the space defined by the cores 12 and 14.

Disc 44 forms two openings or apertures therein. A first opening 28 is centrally located within disc 44 and can be used to secure assembly 10 in an operating position (i.e., by placing a bolt through opening 28 and securing the bolt into a threaded aperture). Opening 30 is positioned laterally of opening 28 and is provided to receive an aligning pin (not illustrated) that extends from a mounting surface so that assembly 10 can be positioned in a specific location with respect to other hardware.

Referring again to FIG. 1, assembly 10 may be used for various filtering purposes. For instance, in one application, assembly 10 is positioned between a power source such as the positive and negative buses of a DC power source and a semiconductor based switching inverter that provides power to a load. In this case, first end 20 of winding 16 may be linked to the negative DC bus while first end 22 of winding 18 is linked to the positive DC bus. Second ends 24 and 26 of winding 16 and 18, respectively, would then lead to the switching inverter and provide negative and positive DC buses thereto, respectively.

Referring again to FIG. 1, when common mode noise currents pass through windings 16 and 18 those common mode currents cause fluxes in the core 12 that add and circle core 12 thus providing high impedance to the common mode noise. For example, assume that a common mode noise current enters each of first ends 20 and 22. In this case, the current passing through coil 16 forms flux that is confined to a clockwise path through core 12. Similarly, the noise current through winding 18 forms a flux confined to a clockwise path and the two fluxes add.

On the other hand, when differential mode currents pass through windings 16 and 18, the fluxes generated by each of the windings are forced in opposite directions within core 12. For example, assuming a first noise current enters first end 20 of winding 16 and that a second noise current identical to the first enters second end 26 of winding 18. In this case, as illustrated by arrow 32 in FIG. 1, the current in coil 16 generates flux confined to a clockwise path within the core. However, as illustrated by arrow 34, the current in winding 18 generates flux confined to a counter-clockwise path.

Referring now to FIGS. 1 through 5, with second core 14 spaced apart from first core 12 as illustrated, the differential mode flux generated within core 12 is effectively ported across the gap 60 and into second core 14. Similarly, as best illustrated in FIG. 4, some of the differential mode flux finds its way back across the gap 60 and into first core 12. In effect, in this case, the gap 60 in FIGS. 1 through 5 operates in a fashion similar to the gaps in the prior art.

One advantage of the present inventive concept is that it is less costly to form a core like the one illustrated in FIG. 6 than it is to form a core out of separate laminates that have to be stacked manually.

Figure 7:
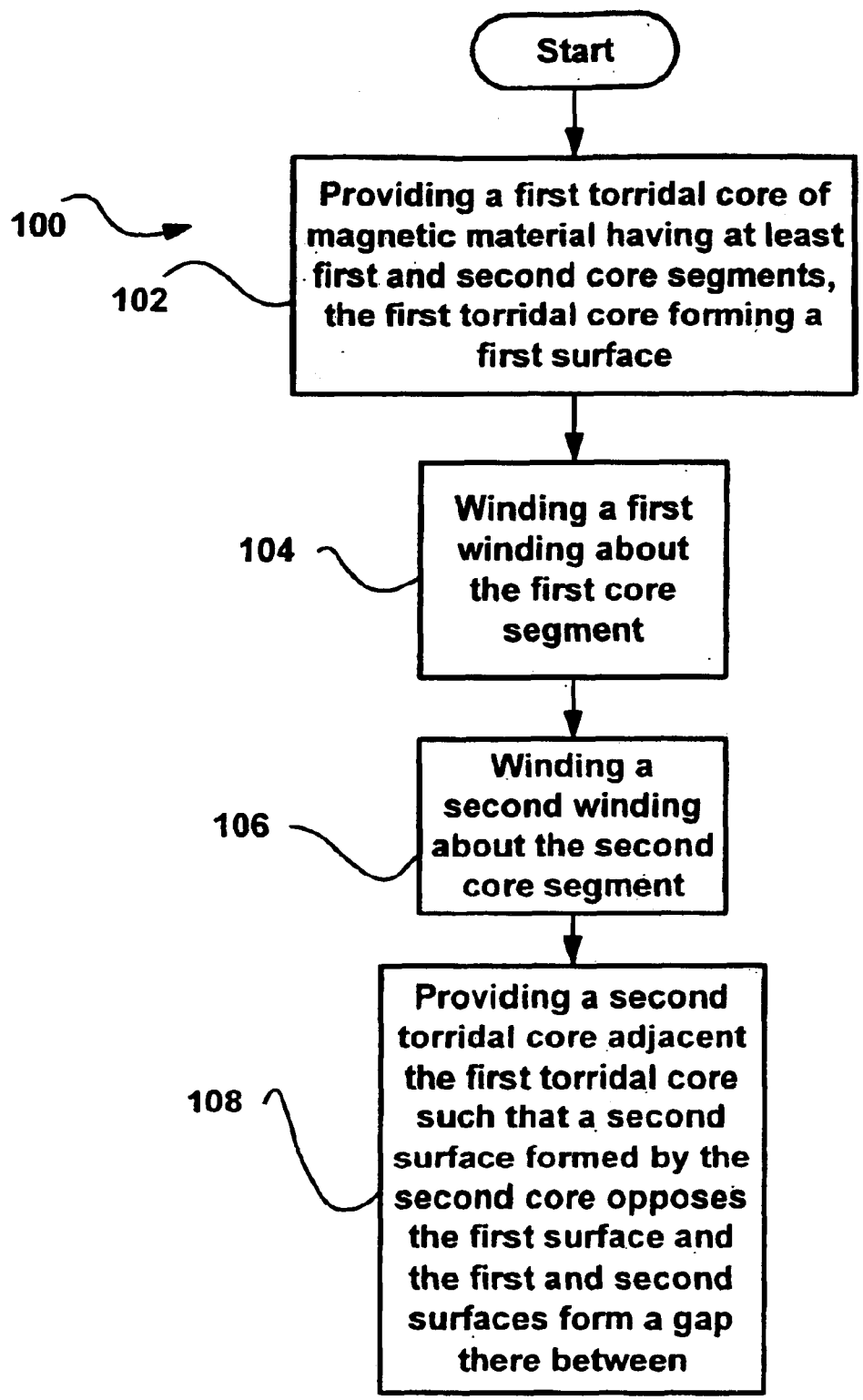
FIG. 7 is a flow chart according to one embodiment of the present invention.

Referring now to FIG. 7, in addition to the inventive configuration or assembly described above, the present includes a method 100 for providing or configuring a common mode/differential mode inductor assembly. To this end, at process block 102 the method includes the step of providing a first toroidal core 12 of magnetic material having at least first and second core segments (i.e., the left and right halves of core 12 in FIG. 1) where the first toroidal core 12 forms a first surface 62. At process block 104, the method includes winding a first winding 16 about the first core segment and at block 106 winding a second winding 18 about the second core segment. Then, at block 108, the method includes the step of providing the second toroidal core 14 adjacent the first toroidal core 12 such that a second surface 64 of second core 14 opposes first surface 62 so that the first and second surfaces form a gap 60 therebetween.

Figure 8:
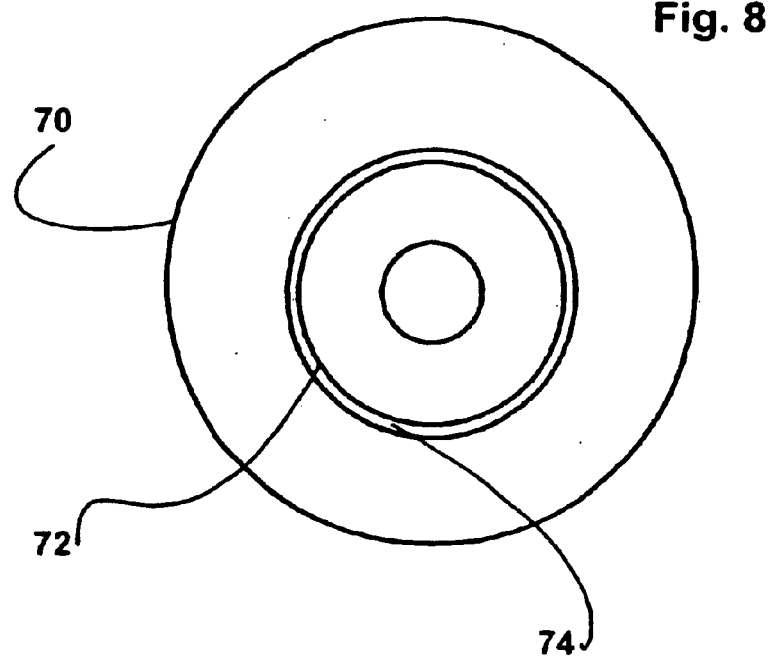
FIG. 8 is a perspective view of two cores that may be used to configure another embodiment of the present invention.

It should be understood that the methods and apparatuses described above are only exemplary and do not limit the scope of the invention, and that various modifications could be made by those skilled in the art that would fall under the scope of the invention. For example, referring to FIG. 8, another embodiment of the invention may include first and second cores 70, 72, respectively, wherein the second core 72 fits within the annular space defined by the first cores 70 such that a small gap 74 is formed between the first and second core 70, 72, respectively. In this case, in one embodiment the windings would be wrapped around first core 70 only and differential flux would pass back and forth between the first and second cores while the common mode flux would simply circle within the first core 70.

To apprise the public of the scope of this invention, the following claims are made.

What is claimed is:

1. A method for forming an electromagnetic assembly having improved damping characteristics, the method for use with a power source including positive and negative source busses and a load including positive and negative load busses, the method comprising the steps of:
   providing a first toroidal core of magnetic material having at least first and second core sections, the first toroidal core forming a first surface;
   winding a first winding about the first core section;
   winding a second winding about the second core section;
   linking opposite ends of the first winding to the positive source bus and the positive load bus;
   linking opposite ends of the second winding to the negative source bus and the negative load bus such that common mode currents traveling from the source to the load cause currents in the first core that travel in the same direction; and
   providing a second toroidal core forming a second surface and positioned relative to the first toroidal core and outside the windings such that the first and second surfaces form an air gap there between.

2. The method of claim 1 further including the step of securing the toroidal cores together.

3. The method of claim 2 wherein the step of securing includes epoxying the cores together.

4. The method of claim 3 further including the step of providing a spacer between the first and second cores prior to epoxying.

5. The method of claim 2 wherein the first toroidal core forms a space and wherein the step of securing further includes the step of filling the space with the epoxy.

6. The method of claim 5 wherein the second toroidal core forms a space and wherein the step of securing further includes filling the space in the second toroidal core with epoxy.

7. The method of claim 5 further including the step of forming a mounting aperture through the epoxy in the space.

8. The method of claim 1 wherein the step of providing the first core includes the step of wrapping a ribbon of metallic material into a torrid form.

9. The method of claim 8 wherein the step of providing the first core further includes the step of coating the torrid form with an insulating varnish binder material.

10. The method of claim 8 wherein the step of providing the second core includes the step of wrapping a ribbon of metallic material into a torrid form.

11. The method of claim 1 wherein the step of providing the first torrid core further includes the steps of forming the core about an axis where the first surface is perpendicular to the axis.

12. The method of claim 1 wherein the step of providing the first toroidal core includes providing the core wherein the first surface is an internal surface and wherein the step of providing the second toroidal core includes providing the second core within the first core such that the second surface faces the first surface.

13. The method of claim 1 wherein the step of providing the second toroidal core includes providing the second core about the first core so that the first core is within the second core.

14. A method for forming an electromagnetic assembly having improved damping characteristics, the method for use with a power source including positive and negative source busses and a load including positive and negative load busses, the method comprising the steps of:

wrapping a ribbon of metallic material providing a first toroidal core of magnetic material having at least first and second core sections, the first toroidal core forming a first surface;

winding a first winding about the first core section;

winding a second winding about the second core section;

linking opposite ends of the first winding to the positive source bus and the positive load bus;

linking opposite ends of the second winding to the negative source bus and the negative load bus such that common mode currents traveling from the source to the load cause currents in the first core that travel in the same direction;

providing a second toroidal core forming a second surface; and positioning the second core relative to the first toroidal core and outside the windings such that the first and second surfaces form an air gap there between.

15. The method of claim 14 wherein the step of providing the second toroidal core includes wrapping a ribbon of metallic material into a torrid form.

16. The method of claim 14 wherein the step of positioning includes securing the first and second cores together.

17. The method of claim 16 wherein the step of securing includes epoxying the cores together.

18. The method of claim 14 wherein the step of positioning includes providing a spacer between the first and second cores.

19. The method of claim 14 wherein the step of providing the first core further includes the step of coating the torrid form with an insulating varnish binder material.

20. The method of claim 14 wherein the step of providing the first torrid core further includes the steps of forming the core about an axis where the first surface is perpendicular to the axis.

21. A method for forming an electromagnetic assembly having improved damping characteristics, the method for use with a power source including positive and negative source busses and a load including positive and negative load busses, the method comprising the steps of:

forming a first toroidal core of magnetic material about an axis wherein the first core includes at least first and second core sections, the first toroidal core forming a first surface substantially perpendicular to the axis;

winding a first winding about the first core section;

winding a second winding about the second core section;

linking opposite ends of the first winding to the positive source bus and the positive load bus;

linking opposite ends of the second winding to the negative source bus and the negative load bus;

providing a second toroidal core forming a second surface; and positioning the second core relative to the first toroidal core and outside the windings such that the first and second surfaces form a gap there between.

22. The method of claim 21 wherein the step of positioning includes the step of providing a spacer between the first and second toroidal cores.

23. The method of claim 22 further including the step of filling the gap with epoxy.

* * * * *